United States Patent [19]

Truzzi et al.

[11] Patent Number: 4,958,614

[45] Date of Patent: Sep. 25, 1990

[54] FEED DEVICE FOR AN INTERNAL COMBUSTION ENGINE

[75] Inventors: Sergio Truzzi, Cisliano; Emilio Oldani, Cerro Maggiore; Ugo Malter, Milan, all of Italy

[73] Assignee: Alfa Lancia S.p.A., Arese, Italy

[21] Appl. No.: 480,012

[22] Filed: Feb. 14, 1990

[30] Foreign Application Priority Data

Feb. 17, 1989 [IT] Italy ............................... 19478 A/89

[51] Int. Cl.$^5$ ............................................. F02D 9/00
[52] U.S. Cl. ..................................... 123/585; 123/587
[58] Field of Search ............. 123/585, 587, 336, 52 M

[56] References Cited

U.S. PATENT DOCUMENTS

| | | | |
|---|---|---|---|
| 3,664,316 | 5/1972 | Garcea | 123/585 |
| 3,943,899 | 3/1976 | Matsuoka et al. | 123/585 |
| 4,285,319 | 8/1981 | Hattori et al. | 123/585 |
| 4,473,055 | 9/1984 | Ito et al. | 123/585 |
| 4,478,186 | 10/1984 | Bauer et al. | 123/585 |
| 4,481,922 | 11/1984 | Sugiura | 123/52 M |

*Primary Examiner*—Andrew M. Dolinar
*Assistant Examiner*—M. Macy
*Attorney, Agent, or Firm*—Charles E. Brown; Charles A. Brown

[57] ABSTRACT

The proposed feed device comprises non-return valve means, preferably of flap type, which are able to open and close the small ducts provided for feeding the individual cylinders of an internal combustion engine when the throttle valves are in their maximum closure position.

7 Claims, 2 Drawing Sheets

FEED DEVICE FOR AN INTERNAL COMBUSTION ENGINE

This invention relates to a mixture or air feed device for an internal combustion engine, particularly on starting while heating up and under idling conditions.

One of the known methods used for increasing the specific power of internal combustion engines is to utilize the dynamic phenomena connected with the pulsating pattern of the mixture of air in the intake and exhaust ducts.

The phenomena which influence the engine volumetric efficiency include the stationary wave which when the valve is closed arises in the intake duct and influences its filling positively or negatively depending upon whether during cross-over or simultaneous opening of the intake and exhaust valves it reaches the intake valve with maximum or minimum pressure.

The engine speeds at which the cross-over stage occurs with a slightly increased intake pressure (greater than the pressure in the cylinder and at exhaust) so that improved filling takes place depend on the sizing, length and cross-section of the intake and exhaust ducts and on the size of the cross-over angle. However, if the timing is set to optimize filling at full engine load, it results in feed irregularity at reduced loads, accentuated by the back flow of exhaust gas to the intake, especially of load adjustment is by only one throttle valve for two or more cylinders.

This irregularity shows up particularly at maximum load reduction with the engine idling at minimum speed.

To eliminate such irregularity, in the case of engines of high specific power the feed ducts to the individual cylinders are each provided with a corresponding throttle valve so that the disturbances produced by one cylinder cannot influence the next in ignition order, via the intake manifold.

In these engines the cylinder feed at idling, when the throttle valves are in their maximum closure position, is via ducts of small cross-section which short-circuit the throttle valves.

To regulate the mixture or air flow to an idling engine, a common chamber is used from which said small cross-section ducts branch and in which there is a single regulator valve instead of using one regulator valve for each duct, which would lead to cylinder alignment difficulties.

The connection between the cylinders, which is formed by said small cross-section ducts and the common chamber, is such that phenomena which influence one cylinder negatively influence the feed to the others. For this reason, Italian Pat. No. 868,745 in the name of the present applicant introduces sized ports in said small cross-section ducts.

This is however not totally adequate if a small mixture or air flow needs to be fed through said small ducts, such as on starting, during engine heating, or in the case of low temperature idling, if accessories such as the air conditioner are to be connected.

This is because to obtain the required feed rate, said sized ports would have to be overdimensioned as the pressure drop between upstream and downstream can be much greater than the critical ratio, so that the velocity through the ports cannot exceed the speed of sound.

Overdimensioning said sized ports is unfavorable if a reverse flow occurs through one of them, with pressure drops considerably less than the critical ratio, because one of the other cylinders is in the induction stage.

To prevent back flow of burnt gases from one cylinder to the intake of the other cylinders, it has been proposed to provide two or even three sized ports in each duct.

The object of the present invention is to provide a method by which the ports providing passage through said ducts are completely shut off in the case of back flow, in which the dimensioning of said passage ports is not restricted, and which is less complicated than that described heretofore.

This is attained according to the present invention by providing, for said ducts, feed ports with which there are engaged respective non-return valve means which enable the feed fluid, whether mixture or air, to flow from a common manifold for said ducts to the individual cylinder feed ducts, but which are able to intercept back flow from said ducts to the common manifold. The present invention therefore provides a feed device for an internal combustion engine, comprising first feed ducts for the cylinders, at least two throttle valves for said first ducts, and second ducts connected to a common manifold communicating with the external environment and with said first ducts so as to short-circuit said at least two throttle valves, said manifold being provided with valve means for regulating the feed flow to the engine when said throttle valves are in their maximum closure position, characterized in that feed ports for said second ducts are also provided, said feed ports being engaged with non-return valve means which allow the feed fluid to flow from said common manifold to said first feed ducts for the cylinders but which intercept back flow from said first ducts to said common manifold. According to a preferred embodiment, said non-return valve means are flap valves.

Characteristics and advantages of the invention are described hereinafter with reference to the accompanying FIGS. 1 to 4 which illustrate a preferred embodiment of the invention by way of non-limiting example.

Figure 1:
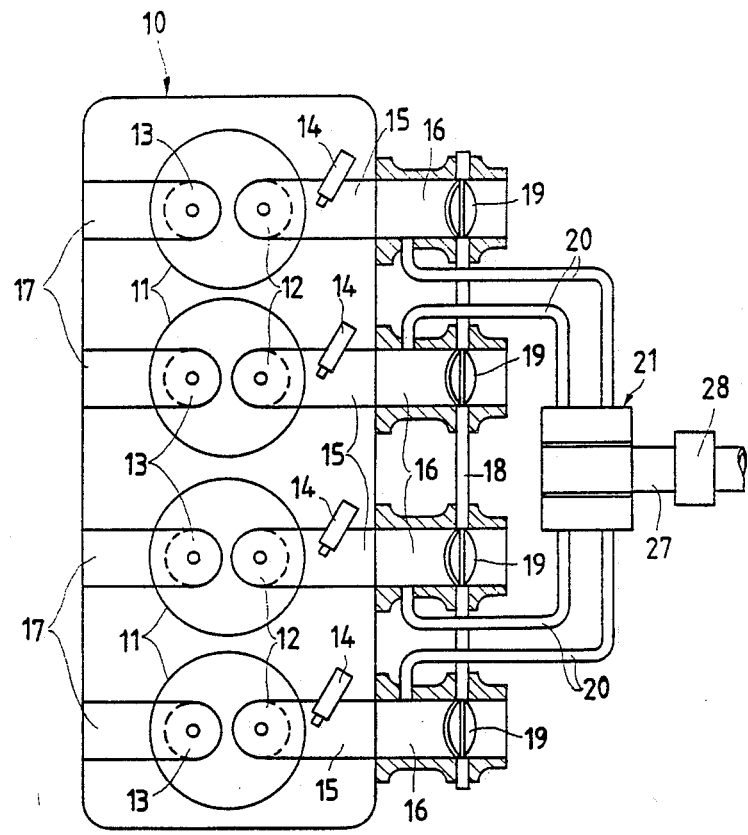
FIG. 1 is a schematic representation of a feed device according to the invention.
Figure 3:
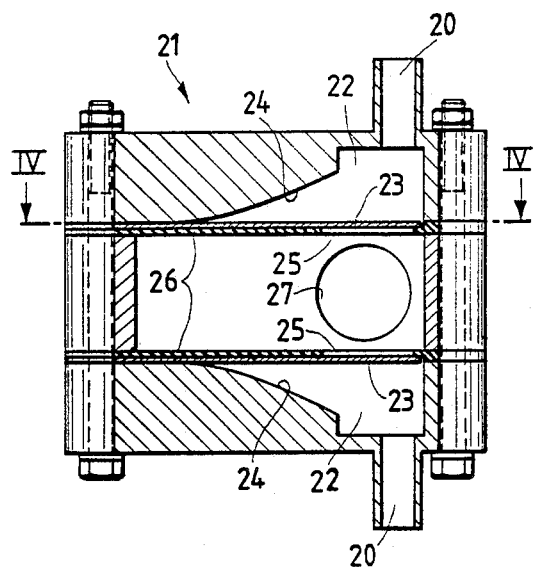
FIG. 3 is a section on the line III—III of FIG. 2.
Figure 4:
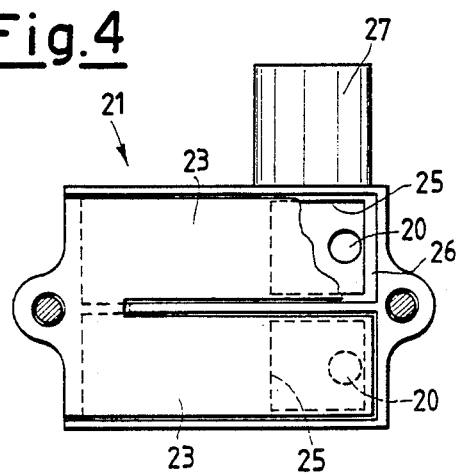

FIG. 4 is a section on the line IV—IV of FIG. 3. In FIG. 1 the reference numeral 10 schematically indicates overall an internal combustion engine, which in this case is an injection-fed four-cylinder in-line engine. There are also shown the cylinders 11, intake valve 12, exhaust valves 13, electrically operated injectors 14, first feed ducts 15 and 16 and exhaust ducts 17, provided in the cylinder head.

To the feed ducts 15 there are flange-connected further individual feed ducts 16, one for each cylinder, rotatably supporting the shaft 18 of respective feed throttle valves indicated by 19. The shaft 18 of the throttle valves 19 is operationally connected to the accelerator pedal, not shown, for operation by the driver of the vehicle to which the engine 10 is fitted.

The reference numeral 20 indicates second ducts, one per cylinder, which open into the ducts 16 downstream of the throttle valves 19, to short-circuit these latter.

Figure 2:
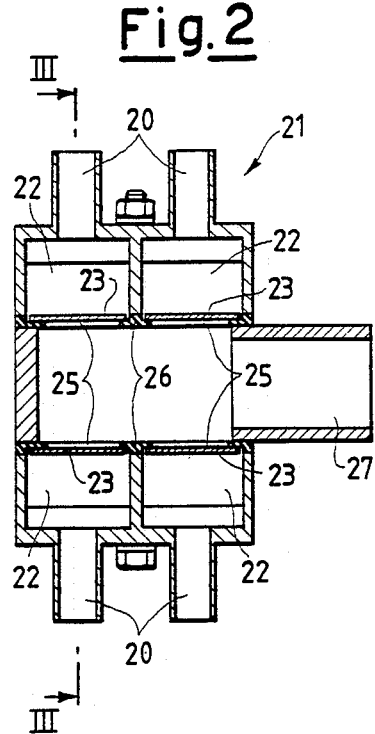
FIG. 2 is an enlarged section through a detail of FIG.1.

The second ducts 20 branch from a chamber indicated overall by 21, in which suitable compartments 22 are provided housing non-return flap valves 23 which are clearly visible in FIGS. 2, 3 and 4. The flap valves, for which travel stops 24 are provided as shown in FIG.

3, are engaged with respective feed ports 25 formed within gaskets 26 and connected to a manifold 27 provided within the chamber 21 and connected to atmosphere via a valve 28 for regulating the engine air intake flow when the throttle valves 19 are in their maximum closure position.

An electronic control centre, not shown, is operationally connected to said electrical injectors 14 and said valve 28, for their control on the basis of chosen engine parameters.

The total engine air intake flow with the throttle valves 19 in their maximum closure position is controlled automatically by the valve 28 so that it is adequate for the various engine operating conditions, i.e., starting, heating with low ambient temperature and idling, even if accessories such as the air conditioning etc. are connected.

At each induction stage of each cylinder 11, a vacuum is established in the relative first 15, 16 downstream of the respective throttle valve 19.

This vaccum is transmitted by the relative second duct 20 to the respective non-return flap valve 23, which is thus subjected to a pressure different than that of the external atmosphere with the result that it lifts automatically from the respective port 25.

With the opening of the port 25 the air is free to flow through the respective second duct 20, to the relative first ducts 15, 16, and then to the respective cylinder 11.

On termination of the induction stage of each cylinder 11, atmospheric pressure is restored in the respective first ducts 15, 16 and is transmitted via the relative second duct 20 to the flap valve 23.

As this is no longer subjected to a pressure difference tending to lift it, it remains engaged with the port 25 and closes it in a fluid-tight manner.

Thus connection between any on of the second ducts 20 and the others is prevented and any back flow of mixture mixed with burnt gases from one of the first ducts 15, 16 to the others is prohibited.

The use of non-return flap valves 23 allows maximum freedom in dimensioning the ports 25 and the second ducts 20, and because of their low inertia they improve the speed and precision of response of the system when operating with the throttle valves 19 in their maximum closure position.

We claim:

1. A feed device for an internal combustion engine, comprising first feed ducts (15, 16) for the cylinders (11), at least two throttle valves (19) for said first ducts, and second ducts (20) connected to a common manifold (27) communicating with the external environment and with said first ducts (15, 16) so as to short-circuit said at least two throttle valves (19), said manifold (27) being provided with valve means (28) for regulating the feed flow to the engine when said throttle valves (19) are in their maximum closure position, characterized in that feed ports (25) for said second ducts (20) are also provided, said feed ports (25) being engaged with non-return valve means (23) which allow the feed fluid to flow from said common manifold (27) to said first feed ducts (15, 16) for the cylinders (11) but which intercept back flow from said first ducts (15, 16) to said common manifold (27).

2. A feed device as claimed in claim 1, characterized in that said non-return valve means (23) are flap valves.

3. A feed device as claimed in claim 1, characterized in that said feed ports (25) are disposed between said common manifold (27) and said second ducts (20).

4. A feed device as claimed in claim 1, characterized by comprising a chamber (21) from which said second ducts (20) branch and within which there are provided suitable compartments (22) housing non-return flap valves (23), and a common manifold (27) provided with feed ports (25) with which said non-return flap valves (23) are engaged.

5. A feed device as claimed in claim 1 characterized in that said non-return valve means are provided with travel stops.

6. A feed device as claimed in claim 1, characterized in that said feed ports are formed within gaskets.

7. A feed device as claimed in claim 2, characterized in that said flap valves are provided with travel stops.

* * * * *